3,490,939
ABLATIVE RESIN

Hyman R. Lubowitz, Redondo Beach, Eugene A. Burns, Palos Verdes Estates, and William P. Kendrick, Manhattan Beach, Calif., assignors, by mesne assignments, to the United States of America as represented by the Administrator of the National Aeronautics and Space Administration No Drawing. Filed May 23, 1966, Ser. No. 551,933
Int. Cl. C23c 11/02
U.S. Cl. 117—106    8 Claims

ABSTRACT OF THE DISCLOSURE

A method and structure for retarding the rate of regression of an ablative surface by incorporating a polyalkaline earth metal acrylate in the ablative material. When the ablative material is subjected to high temperature gases, the alkaline earth metal acrylate decomposes to form a protective oxide coating on the surface of the ablative material.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to ablative resins and more particularly to polymeric alkaline earth metal acrylates, and a composition containing the polymer and process for retarding rate of regression of an ablative surface exposed to high temperature gases.

Ablative resins employed for the fabrication of rocket nozzles and the like have typically been produced from phenol-formaldehyde resins and epoxy resinous materials. The conventional materials while exhibiting desirable thermal shock characteristics ablate rapidly and lead to early dimensional instability of the ablator structure, particularly in fluorine/hydrogen combustion gas product environments.

It is a principal object of the invention to provide an improved ablative resin and resinous composites containing such material.

It is another object of the invention to provide an ablative resin which in the presence of high temperature exhaust gases forms a relatively stable oxide protective coating.

It is a still further object of the invention to provide a process for retarding the rate of regression of an ablative surface exposed to high temperature gases.

Polyalkaline earth metal acrylates have been found to have exceptionally superior ablative qualities and unlike ablative resins proposed heretofore will in the presence of high temperature exhaust gases decompose to form a continuous protective coating of an oxide on the exposed surfaces. Alkaline earth metal acrylates exhibit an exceptionally high stability and have been found to retard significantly the rate of regression of an ablative surface in which they are incorporated. The dimensional stability of the ablator is thus prolonged by the formation of the coating. At the high temperature of the discharge gas of a rocket engine, the protective oxide coating takes the form of a molten film.

The alkaline earth metal acrylate polymers exhibit particularly superior resistance to the combustion products of a fluorine/hydrogen propellent combination. The acrylate resin is substantially insensitive to thermal shock. In contrast, the oxides of alkaline earth metals per se may not be used as ablators because they, as ceramic materials, are friable and sensitive to thermal shock. It has been found that the physical incorporation of an alkaline earth metal oxide powder into an ablative resin matrix such as an epoxy material for the purpose of preparing a shock stable ablator is unsuitable as the oxide coating forming on the resin during the ablative process will not withstand the erosive action of the discharging exhaust gases. The oxide coating forming on the ablative surface from the powdered alkaline earth metal oxide is subject to undercutting, leading to rapid erosion. The chemical binding of the alkaline earth metal provided by the acrylate polymer is apparently responsible for the superior protective film. This is true even where the polyalkaline earth metal acrylate is used as one of the several resins of an ablative composite, for example, in combination with such conventional ablative resins as a phenol-formaldehyde polymer or an epoxy resin.

The polyalkaline earth metal acrylate material may be hot pressed into neat resin masses of configurations suitable for use in thrust chamber liners and nozzle components of rocket engines and other high temperature applications. The polymer is fused into a compact resin mass by the application of high pressures, for example, in the range of 15,000 to 20,000 p.s.i. at relatively high temperatures in the range of 300 to 400° C. During the heat pressing operation the polymer is desirably maintained in an evacuated atmosphere. The neat mass may be machined into useful objects. It has been found that the polycalcium acrylate resin is the toughest of the alkaline earth metal acrylate polymers. The magnesium version of the polymer is generally the most suitable as an ablative resin because it provides the greatest retardation of the rate of regression of an ablator surface.

The polyalkaline earth metal acrylates are desirably prepared by a free radical catalysis of an alkaline earth metal acrylate monomer dissolved in water. The free radical catalysis may be initiated by various ones of the known organic and inorganic peroxides such as:

Di-t-butyl peroxide;
2,5-dimethyl-2,5-bis(tertiary butylperoxy) hexane;
n-Butyl-4,4-bis(tertiary butylperoxy) valerate;
2,5-dimethyl-2,5-bis(tertiary butylperoxy) hexyne-3;
Tertiary-butyl perbenzoate;
Hydrogen peroxide.

The polymerization is generally carried on at a temperature in the range of 100 to 105° C. and the peroxide is supplied in an amount of 0.001 to 1.0 part by weight per part of the monomer. The polymer product of the reaction will precipitate out of the water. The polymer is then isolated and dried to an anhydrous condition. Desirably, the anhydrous polymer is finely ground to facilitate its use in the fabrication of an ablative structure. Where the acrylate resin of the invention is incorporated in a resin composite it has been found permissible to employ the alkaline earth metal acrylate polymer in a minor amount of the total resin, say 20–60% by weight, with a conventional ablative resin such as an epoxy resin or a phenol-formaldehyde resin being present in a predominant amount.

It is established by infrared spectometry that the vinyl group is absent from the polymer and that there is an oxygen-metal bond. Further compositional analyses confirm that two acrylic molecules exist in the polyalkaline earth metal acrylate composition per one metal atom.

EXAMPLE I

Calcium acrylate monomer is prepared by the following procedure: Dissolve 72.06 parts acrylic acid (M.P. 12–14° C.) in 500 parts water. Transfer slowly 55.05 parts calcium carbonate to the acrylic acid solution. Stir the solution continuously during addition of the calcium carbonate and for a period of 4 hours after addition. Allow the unreacted calcium carbonate to settle out of solution and filter the supernatant liquid. Precipitate the calcium acrylate monomer from the filtered supernatant liquid by an addition of an equal volume of acetone. Filter the precipitate and wash three times with acetone. Then dry overnight at 90° C.

Polycalcium acrylate is prepared by the following procedure: Transfer 10 parts of the dried calcium acrylate monomer to a distillation flask containing 100 parts water and a stirring apparatus. Stir the solution until well mixed and then heat to boiling and reflux for 10 minutes. Add 2 drops of t-butyl perbenzoate per 100 ml. of solution and continue refluxing for an additional 10 minutes. Allow the flask to cool to room temperature and then manually remove the white rubber-like polycalcium acrylate. Wash the precipitate three times with water, dry it overnight at 100° C. and then grind it to pass a 200 mesh sieve screen.

Hard compact masses of polycalcium acrylate are prepared in the following manner: The material is transferred to a hot vacuum press and subjected to the following conditions for a period of 30 minutes: 15,000 p.s.i., 350° C., and vacuum of about 1 torr. The resultant product is a hard white homogeneous material having a density of 1.858 g./ml. The pressed polycalcium acrylate is insensitive to the thermal shock imposed by an oxygen-hydrocarbon and fluorine-hydrogen flame. The ability of this material to withstand a 10 second exposure of a fluorine/hydrogen flame was determined by measurement of the volume loss which took place on exposure for 10 seconds to a fluorine/hydrogen flame at a volume ratio of 1.0 and located 1.25 inches from the torch tip. The volume loss of the polycalcium acrylate was 0.16 cm.$^3$. Comparable phenolic resins (Monsanta SC–1008) had a volume loss of 0.31 cm.$^3$ when subjected to a similar test.

EXAMPLE II

An alternative procedure for the preparation of polycalcium acrylate is described below.

Transfer 10 parts of the powdered calcium acrylate monomer prepared in Example I to a distillation flask containing 100 parts acetone and a stirring apparatus. Heat the solution boiling with continuous vigorous stirring. Add 4 drops of t-butyl perbenzoate per 100 ml. of solution and then reflux for a period of 30 minutes. Cool the flask to room temperature and retrieve the precipitate in the flask by filtration. Wash the solid material in water, then dry and grind it as described in Example I.

Compact resin masses can be prepared in a manner similar to that described in Example I.

EXAMPLE III

The polymagnesium acrylate is prepared in the following manner; Mix 72 parts acrylic acid (M.P. 12–14° C.) with 500 parts water. Slowly add 55 parts magnesium carbonate into the solution and continue mixing for 4 hours. Allow the unreacted magnesium carbonate to settle and then filter the supernatant liquid. Transfer the filtered magnesium acrylate monomer solution to a distillation flask equipped with a stirring apparatus. Bring the solution to boiling and reflux for 10 minutes with stirring. Add 4 drops of t-butyl perbenzoate and continue refluxing for an additional 10 minutes. Cool the flask to room temperature and remove the white rubber-like polymagnesium acrylate. Wash the precipitate three times with water, dry it overnight at 100° C. and then grind it to pass a 200 mesh sieve screen. The polymagnesium acrylate monohydrate and dihydrate are hygroscopically stable in air. The anhydrous polymer increases its weight in air to a value which corresponds to that expected for the monohydrate.

EXAMPLE IV

The polybarium acrylate is prepared in the following manner: Mix 72 parts acrylic acid (M.P. 12–14° C.) with 500 parts water. Slowly add 108 parts barium carbonate into the solution and continue mixing for 4 hours. Allow the unreacted barium carbonate to settle and then filter the supernatant liquid. Transfer the filtered barium acrylate monomer solution to a distillation flask equipped with a stirring apparatus. Bring the solution to boiling and reflux for 10 minutes with stirring. Add 4 drops of t-butyl perbenzoate and continue refluxing for an additional 10 minutes. Cool the flask to room temperature and remove the white, rubber-like polybarium acrylate. Wash the precipitate three times with water, dry it overnight at 100° C., and then grind to pass a 200 mesh sieve screen. The polybarium acrylate monohydrate and dihydrate are stable forms of the polymer in air.

We claim:
1. A process for retarding the rate of regression of an ablative surface exposed to high temperature gases, said process comprising:
   providing an ablative structure containing a fused polyalkaline earth metal acrylate; and
   exposing the surface of the ablative structure to high temperature gases
   sufficiently hot to decompose said polyalkaline earth metal acrylate whereby a continuous oxide film of said alkaline earth metal forms on said surface to protect same.

2. A process in accordance with claim 1 wherein the polyalkaline earth metal acrylate is selected from the group consisting of polymagnesium acrylate, polycalcium acrylate, and polybarium acrylate.

3. A process in accordance with claim 1 wherein the ablative structure is a resin composite having the polyalkaline earth metal acrylate present with a second heat ablative resin selected from the group consisting of a phenol-formaldehyde resin and an epoxy resin.

4. A process an accordance with claim 1 wherein the ablative structure contains the polyalkaline earth metal acrylate as the sole resin.

5. An ablative structure comprising a resin mass containing a fused polyalkaline earth metal acrylate and having a surface thereof continuously covered by an oxide of said alkaline earth metal, said oxide being intergrally bonded to said ablative structure.

6. An ablative structure in accordance with claim 5 wherein the resin mass is a neat resin mass of the polyalkaline earth metal acrylate selected from the group consisting of polymagnesium acrylate, polycalcium acrylate, and polybarium acrylate.

7. An ablative structure in accordance with claim 5 wherein the resin mass comprises a composite of the polyalkaline earth metal acrylate and a second heat ablative resin selected from the group consisting of a phenol-formaldehyde resin and an epoxy resin.

8. An ablative structure in accordance with claim 5 wherein the polyalkaline earth metal acrylate contains one metal atom per two acrylic molecules.

References Cited

UNITED STATES PATENTS 3,377,213   4/1968   Hiller _____ 117—118 X

FOREIGN PATENTS 1,367,994   France.

WILLIAM D. MARTIN, Primary Examiner
J. E. MILLER, JR., Assistant Examiner

U.S. Cl. X.R.

117—118, 138.8; 60—271; 102—105; 260—844